United States Patent
Destro et al.

(10) Patent No.: US 10,316,123 B2
(45) Date of Patent: *Jun. 11, 2019

(54) PROPYLENE BASED TERPOLYMER FOR CONTAINERS

(71) Applicant: BASELL POLYOLEFINE ITALIA S.R.L., Milan (IT)

(72) Inventors: Mara Destro, Ferrara (IT); Marco Ciarafoni, Ferrara (IT); Paola Massari, Ferrara (IT); Stefano Squarzoni, Ferrara (IT); Thomas Bohm, Darmstadt (DE)

(73) Assignee: Basell Poliolefine Italia S.r.l., Milan (IT)

( * ) Notice: Subject to any disclaimer, the term of this patent is extended or adjusted under 35 U.S.C. 154(b) by 96 days.

This patent is subject to a terminal disclaimer.

(21) Appl. No.: 14/896,430

(22) PCT Filed: May 6, 2014

(86) PCT No.: PCT/EP2014/059200
§ 371 (c)(1),
(2) Date: Dec. 7, 2015

(87) PCT Pub. No.: WO2014/195074
PCT Pub. Date: Dec. 11, 2014

(65) Prior Publication Data
US 2016/0130378 A1 May 12, 2016

(30) Foreign Application Priority Data
Jun. 6, 2013 (EP) ..................................... 13170721

(51) Int. Cl.
*B65D 1/02* (2006.01)
*C08F 210/14* (2006.01)
*C08F 210/06* (2006.01)
*C08F 210/16* (2006.01)

(52) U.S. Cl.
CPC .......... *C08F 210/14* (2013.01); *B65D 1/0207* (2013.01); *C08F 210/06* (2013.01); *C08F 210/16* (2013.01)

(58) Field of Classification Search
CPC ...... C08F 210/06; C08F 210/14; C08L 23/08; C08L 23/0807; C08L 23/0815; C08L 23/10; Y10T 428/13; Y10T 428/1352; Y10T 428/1397; B29K 2023/10; B65D 1/02; B65D 1/0207; B65D 1/0215; B29C 49/0005
USPC .... 526/348–348.5, 351, 352, 916; 428/35.7; 252/240
See application file for complete search history.

(56) References Cited

U.S. PATENT DOCUMENTS

| | | | | |
|---|---|---|---|---|
| 4,404,162 A | * | 9/1983 | Miki | B29C 51/04 264/512 |
| 6,388,040 B1 | * | 5/2002 | Fujita | C08F 10/00 526/126 |
| 8,017,206 B2 | | 9/2011 | De Palo et al. | |
| 9,205,967 B2 | | 12/2015 | Renders et al. | |
| 9,656,783 B2 | | 5/2017 | Lyzenga et al. | |
| 9,688,442 B2 | | 6/2017 | Lyzenga et al. | |
| 9,708,104 B2 | | 7/2017 | Lyzenga et al. | |
| 2001/0050287 A1 | * | 12/2001 | Namba | B65D 1/265 220/592.17 |
| 2003/0216527 A1 | * | 11/2003 | Sugano | C08F 10/06 526/90 |
| 2009/0149613 A1 | * | 6/2009 | Ravishankar | C08F 210/06 526/126 |
| 2009/0274921 A1 | * | 11/2009 | Ackermans | B32B 27/32 428/516 |
| 2013/0030137 A1 | | 1/2013 | Cavalieri et al. | |
| 2013/0121624 A1 | | 5/2013 | Lyzenga et al. | |
| 2013/0165613 A1 | | 6/2013 | Marzolla et al. | |
| 2014/0212608 A1 | | 7/2014 | Marzolla et al. | |

FOREIGN PATENT DOCUMENTS

| | | | |
|---|---|---|---|
| EP | 1941997 A1 | 7/2008 | |
| ES | 2390202 T3 | 11/2012 | |
| WO | 2006002778 A1 | 1/2006 | |
| WO | WO-2011128146 A1 | 10/2011 | |
| WO | WO 2011146616 A1 * | 11/2011 | ............. B65B 9/207 |
| WO | WO-2012031951 A1 | 3/2012 | |
| WO | 2012125945 A1 | 9/2012 | |
| WO | WO-2013030314 A1 | 3/2013 | |

OTHER PUBLICATIONS

PCT International Search Report and Written Opinion for PCT/EP2014/059200 dated Aug. 20, 2014.

* cited by examiner

*Primary Examiner* — Lee E Sanderson

(57) ABSTRACT

A container comprising a propylene, ethylene, 1-hexene terpolymer wherein:
(i) the content of ethylene derived units ranges from 0.2 wt % to 1.0 wt %;
(ii) the content of 1-hexene derived units ranges from 3.5 wt % to 5.5 wt %;
(iii) the content of ethylene derived units fulfills the following equation (I);

$$C2 < C6*0.16 \qquad (I);$$

wherein C2 is the content of ethylene derived units wt % and C6 is the content of 1-hexene derived units wt %; and
(iv) the melt flow rate MFR measured according to ISO 1133, 230° C., 2.16 kg ranges from 15 to 80 g/10 min.

8 Claims, No Drawings

PROPYLENE BASED TERPOLYMER FOR CONTAINERS

FIELD OF THE INVENTION

The present invention relates to containers especially containers for food having a particular balance of mechanical and optical properties. Said container comprises a propylene/ethylene/1-hexene terpolymer having particular properties.

BACKGROUND OF THE INVENTION

Propylene/ethylene/1-hexene terpolymer are used for the production of pipes or films. For example, WO2006/002778 relates to a pipe system comprising a terpolymer of propylene/ethylene and alpha olefin where the ethylene content is from 0 to 9% by mol, preferably from 1 to 7% by mol and the 1-hexene content ranges from 0.2 to 5% wt. U. S. Pat. No. 6,365,682 relates to propylene based terpolymers to be used for films. The ethylene content ranges generally from 1 to 10 wt % and the alpha olefin ranges from 5 to 25 wt %. for the preparation of films.

SUMMARY OF THE INVENTION

The applicant found that containers, including containers for food, can be obtained by using a propylene-ethylene-1-hexene terpolymer having a particular composition. Thus, an object of the present technology is a container such as, a container for food comprising a propylene, ethylene and 1-hexene terpolymer, wherein in the terpolymer:
i) the content of ethylene derived units ranges from 0.2 wt % to 1.0 wt %; including from 0.3wt % to 0.8 wt % and from 0.4 wt % to 0.7 wt %;
ii) the content of 1-hexene derived units ranges from 3.5 wt % to 5.5 wt %; including from 3.8 wt % to 5.0 wt and from 4.0 wt % to 4.7 wt %;
iii) the content of ethylene derived units fulfills the following equation (I);

$$C2<C6*0.16 \qquad (I);$$

including C2<C6*0.15; more preferably C2<C6*0.14 and C2<C6*0.13; wherein C2 are the ethylene derived units and C6 are the 1-hexene derived units;
iv) the melt flow rate (MFR) measured according to ISO 1133,230° C., 2.16 kg ranges from 15 to 80 g/10 min; including from 20 to 50 g/10 min and from 25 to 45 g/10 min.

In some embodiments, the terpolymer contains only propylene, ethylene and 1-hexene, with the sum of these three comonomers being 100 wt %. In order to achieve the MFR of the terpolymer it is also possible to visbreak a polymer having a lower MFR. In order to visbreak the polymer, known visbreaking agents can be used such as peroxides. With visbreaking it is possible to fine tune the MFR of the product.

In some embodiments, the terpolymers have a stereoregularity of isotactic type with respect to the propylenic sequences, where the value of xylene extractables is lower than 15 wt %.

In certain embodiments, the containers of the present technology are characterized by a low level of extractable hexane that renders them particularly suitable for containing food. The hexane extractables measured according to FDA 21 77:1520 is, in some embodiments, lower than 2.0 wt %, including lower than 1.9 wt % and equal to or lower than 1.87 wt %.

In certain embodiments, the container of the present technology is characterized by a low haze value including lower than 18.0% (measured on 2 mm plaque), lower than 16.0% and lower than 15.5%.

The containers of the present technology show improved impact property values. For instance, a container having 0.4 mm wall thick the container impact test at 0° C. shows values higher than 3.0 J, including higher than 3.2 J and higher than 3.5 J. The container impact test at −20° C. shows values higher than 3.2 J, higher than 3.5 J and higher than 4.0 J.

In further embodiments, the containers of the present technology show preferably good values of top load. For instance, the top load of a container having a 0.4 mm thick wall is higher than 180 N including higher than 200 N.

The containers of the present technology can be obtained with methods known in the art such as injection molding.

The terpolymer for the container of the present invention can be prepared by polymerization in one or more polymerization steps. Such polymerization can be carried out in the presence of Ziegler-Natta catalysts, which may comprise a titanium compound having at least one titanium-halogen bond, and an electron-donor compound, both supported on a magnesium halide in active form and further comprise an organoaluminium compound, such as an aluminium alkyl compound. An external donor is optionally added.

The catalysts generally used in the present technology are capable of producing polypropylene with a value of xylene insolubility at ambient temperature of greater than 90%, including greater than 95%.

Catalysts having the above mentioned characteristics are described, e.g. in U.S. Pat. No. 4,399,054, EP Pat. No. 45977 and U.S. Pat. No. 4,472,524.

The solid catalyst components used in these catalysts may comprise, as electron-donors (internal donors), compounds selected from the group consisting of ethers, ketones, lactones, compounds containing N, P and/or S atoms, and esters of mono- and dicarboxylic acids, including electron-donor compounds comprising esters of phtalic acid and 1,3-diethers of the general formulas:

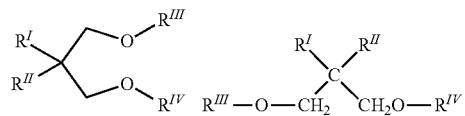

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6, or 7 carbon atoms, or of 5-n or 6-n' carbon atoms, and respectively n nitrogen atoms and n' heteroatoms are selected from the group consisting of N, O, S and Si, where n is 1 or 2 and n' is 1, 2, or 3, said structure containing two or three unsaturation sites (cyclopolyenic structure), and optionally being condensed with other cyclic structures, or substituted with one or more substituents selected from the group consisting of linear or branched alkyl radicals; cycloalkyl, aryl, aralkyl, alkaryl radicals and halogens, or being condensed with other cyclic structures and substituted with one or more of the above mentioned substituents that can also be bonded to the condensed cyclic structures; one or more of the above mentioned alkyl, cycloalkyl, aryl, aralkyl, or alkaryl radicals and the condensed cyclic structures optionally containing one or more heteroatom(s) as substitutes for carbon or hydrogen atoms, or both.

Ethers of this type are described in published EP Pat. Apps. 361493 and 728769.

Representative examples of diethers for use in the present technology are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2isoamyl-1,3-dimethoxypropane and 9,9-bis(methoxymethyl) fluorene.

Other suitable electron-donor compounds are phthalic acid esters such as diisobutyl, dioctyl, diphenyl and benzyl-butyl phthalate.

It is also possible to use mixtures of at least two electron donor compounds, one of which is present in an amount from 30 to 90% by mol with respect to the total amount of donors and selected from succinates and 1,3 diethers.

The preparation of the catalyst components described herein are carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to magnesium dihalide.

The titanium compounds, which can be used for the preparation of the solid catalyst component, including the halides and the halogen alcoholates of titanium such as titanium tetrachloride. The reactions described above are capable of producing magnesium halide in an active form. Other reactions are known in the literature, which cause the formation of magnesium halide in active form starting from magnesium compounds other than halides, such as magnesium carboxylates.

The Al-alkyl compounds used as co-catalysts may be selected from Al-trialkyls such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound may be used in such a quantity that the Al/Ti ratio is in a range of from 1 to 1000.

The electron-donor compounds that can be used as external donors include aromatic acid esters such as alkyl benzoates including silicon compounds containing at least one Si—OR bond, where R is a hydrocarbon radical. Examples of silicon compounds for use in the present technology include (tert-butyl)$_2$Si(OCH$_3$)$_2$, (cyclohexyl)(methyl)Si (OCH$_3$)$_2$, (cyclopentyl)$_2$Si(OCH$_3$)$_2$ and (phenyl)$_2$Si (OCH$_3$)$_2$ and (1,1,2-trimethylpropyl)Si(OCH$_3$)$_3$. 1,3-diethers having the formulae described above can also be used advantageously. In certain embodiments, if the internal donor is one of these diethers, the external donors can be omitted.

In certain embodiments, the terpolymers of the present technology may be prepared by using catalysts containing a phthalate as internal donor and (cyclopentyl)$_2$Si(OCH$_3$)$_2$ as outside donor, or the said 1,3-diethers as internal donors. The propylene-ethylene-hexene-1 polymers may be produced with a polymerization process illustrated in EP App. 1 012 195.

In some embodiments, the processes described herein comprise feeding the monomers to said polymerization zones in the presence of catalyst under reaction conditions and collecting the polymer product from the polymerization zones. In accordance with some embodiments of the processes described herein, the growing polymer particles flow upward through one (first) of the said polymerization zones (riser) under fast fluidization conditions, leave the riser and enter another (second) polymerisation zone (downcomer) through which they flow downward in a densified form under the action of gravity, leave the said downcomer and are reintroduced into the riser, thus establishing a circulation of polymer between the riser and the downcomer.

In the downcomer high values of density of the solid are reached, which approach the bulk density of the polymer. A positive gain in pressure can thus be obtained along the direction of flow, so that it is possible to reintroduce the polymer into the riser without the help of special mechanical means. In this way, a "loop" circulation is set up, which is defined by the balance of pressures between the two polymerization zones and by the head loss introduced into the system.

Generally, the condition of fast fluidization in the riser is established by feeding a gas mixture comprising the relevant monomers to the riser. In some embodiments, the feeding of the gas mixture is effected below the point of reintroduction of the polymer into the said riser by the use, where appropriate, of gas distributor means. In certain embodiments, the velocity of transport gas into the riser is higher than the transport velocity under the operating conditions, such as from 2 to 15 m/s.

In some embodiments, the polymer and the gaseous mixture leaving the riser are conveyed to a solid/gas separation zone. The solid/gas separation can be effected by using conventional separation means. From the separation zone, the polymer may enter the downcomer. The gaseous mixture leaving the separation zone may be compressed, cooled and transferred, if appropriate with the addition of make-up monomers and/or molecular weight regulators, to the riser. The transfer can be effected by means of a recycle line for the gaseous mixture. The control of the polymer circulating between the two polymerization zones can be effected by metering the amount of polymer leaving the downcomer using means suitable for controlling the flow of solids, such as mechanical valves.

The operating parameters, such as the temperature, are those that are usual in olefin polymerization process, including between 50 and 120° C. This first stage process can be carried out under operating pressures of between 0.5 and 10 MPa, including between 1.5 and 6 MPa.

Advantageously, one or more inert gases may be maintained in the polymerization zones, in such quantities that the sum of the partial pressure of the inert gases is preferably between 5 and 80% of the total pressure of the gases. The inert gas can be nitrogen or propane, for example.

The various catalysts may be fed up to the riser at any point of the riser. However, they can also be fed at any point of the downcomer. The catalyst can be in any physical state, therefore catalysts in either solid or liquid state can be used.

Conventional additives, fillers and pigments, commonly used in olefin polymers, may be added, such as nucleating agents, extension oils, mineral fillers, and other organic and inorganic pigments. In addition, inorganic fillers such as talc, calcium carbonate and mineral fillers, may be used and may improve some mechanical properties of the polymers, such as flexural modulus and HDT. Talc can also have a nucleating effect.

The nucleating agents may be added to the compositions of the present technology in quantities ranging from 0.05 to 2% by weight, including from 0.1 to 1% by weight, with respect to the total weight.

The containers of the present technology can have various shapes, such as cubic, conic, or irregular shapes.

EXAMPLES

Characterization Methods

Melting temperature and crystallization temperature were determined by differential scanning calorimetry (DSC), weighting 6±1 mg, by heating the sample to 220±1° C. at a rate of 20° C./min and maintaining for 2 minutes in a nitrogen stream then cooled at a rate of 20° C./min to 40±2° C. and maintained at this temperature for 2 min to crystallize the sample. The sample is then fused at a temperature rate increase of 20° C./min up to 220° C.±1. The melting scan is recorded, a thermogram is obtained and melting temperatures and crystallization temperatures are determined.

Melt Flow Rate: determined according to the method ISO 1133 (230° C., 5 kg).

Solubility in Xylene:

2.5 g of polymer and 250 ml of xylene are introduced in a glass flask equipped with a refrigerator and a magnetic stirrer. The temperature is raised in 30 minutes up to the boiling point of the solvent. The resulting clear solution is then kept under reflux and stirring for 30 minutes. The closed flask is then kept for 30 minutes in a bath of ice and water and in a thermostatic water bath at 25° C. for 30 minutes. The resulting solid is filtered on quick filtering paper. 100 ml of the filtered liquid is poured in a previously weighed aluminium container, which is heated on a heating plate under nitrogen flow, to remove the solvent by evaporation. The container is heated at 80° C. under vacuum until a constant weight is obtained. The weight percentage of polymer soluble in xylene at room temperature is then calculated.

1-hexene and ethylene content: determined by $^{13}$C-NMR spectroscopy in terpolymers:

NMR Analysis. $^{13}$C NMR spectra were acquired on an AV-600 spectrometer operating at 150.91 MHz in Fourier transform mode at 120° C. The peak of the propylene CH was used as an internal reference at 28.83. The $^{13}$C NMR spectrum is acquired using the following parameters:

| Spectral width (SW) | 60 ppm |
| Spectrum centre (O1) | 30 ppm |
| Decoupling sequence | WALTZ 65_64pl |
| Pulse program [1] | ZGPG |
| Pulse Length (P1) [2] | for 90° |
| Total number of points (TD) | 32K |
| Relaxation Delay [2] | 15 s |
| Number of transients [3] | 1500 |

The total amount of 1-hexene and ethylene as molar percent is calculated from diad using the following relations:

$$[P]=PP+0.5PH+0.5PE$$

$$[H]=HH+0.5PH$$

$$[E]=EE+0.5PE$$

Assignments of the $^{13}$C NMR spectrum of propylene/1-hexene/ethylene copolymers have been calculated according to the following table:

| Area | Chemical Shift | Assignments | Sequence |
|---|---|---|---|
| 1 | 46.93-46.00 | $S_{\alpha\alpha}$ | PP |
| 2 | 44.50-43.82 | $S_{\alpha\alpha}$ | PH |
| 3 | 41.34-4.23 | $S_{\alpha\alpha}$ | HH |
| 4 | 38.00-37.40 | $S_{\alpha\gamma}+S_{\alpha\delta}$ | PE |
| 5 | 35.70-35.0 | $4B_4$ | H |
| 6 | 35.00-34.53 | $S_{\alpha\gamma}+S_{\alpha\delta}$ | HE |
| 7 | 33.75 33.20 | CH | H |
| 8 | 33.24 | $T_{\delta\delta}$ | EPE |
| 9 | 30.92 | $T_{\beta\delta}$ | PPE |
| 10 | 30.76 | $S_{\gamma\gamma}$ | XEEX |
| 11 | 30.35 | $S_{\gamma\delta}$ | XEEE |
| 12 | 29.95 | $S_{\delta\delta}$ | EEE |
| 13 | 29.35 | $3B_4$ | H |
| 14 | 28.94-28.38 | CH | P |
| 15 | 27.43-27.27 | $S_{\beta\delta}$ | XEE |
| 16 | 24.67-24.53 | $S_{\beta\beta}$ | XEX |
| 17 | 23.44-23.35 | $2B_4$ | H |
| 18 | 21.80-19.90 | $CH_3$ | P |
| 19 | 14.22 | $CH_3$ | H |

Haze (on 2 mm plaque):

5×5 cm specimens are cut molded into plaques of 2 mm thickness and the haze value is measured using a Gardner photometer with Haze-meter UX-10 equipped with a G.E. 1209 lamp and filter C. The instrument calibration is made by carrying out a measurement in the absence of the sample (0% Haze) and a measurement with intercepted light beam (100% Haze). The measurement and computation methods are given in ASTM-D1003.

The plaques to be tested are produced according to the following method. 75×75×2 mm plaques are molded with a GBF Plastiniector G235/90 Injection Molding Machine, 90 tons under the following processing conditions:
Screw rotation speed: 120 rpm
Back pressure: 10 bar
Melt temperature: 260° C.
Injection time: 5 sec
Switch to hold pressure: 50 bar
First stage hold pressure: 30 bar
Second stage pressure: 20 bar
Hold pressure profile: First stage 5 sec
  Second stage 10 sec
Cooling time: 20 sec
Mold water temperature: 40° C.

The plaques are conditioned for 12 to 48 hours at a relative humidity of 50% and a temperature of 23° C.

Haze on Container:

The haze on container was measured by cutting 5×5 cm specimens from the container wall and using the same above procedure for the haze (on 2 mm plaque).

Top Load:

For the test a Instron dynamometer was used, equipped with a balance of 0.2 g accuracy and with a micrometer of 0.01 mm accuracy. After at least 10 hours of conditioning at 23° C. and 50% relative humidity, the bottle is settled between the two plates of the dynamometer and compressed with a stress velocity of the plate of 10 mm/min. The stress at collapse of the bottle is recorded and the value reported in N. The Top Load value is the mean value obtained from measurements repeated on 10 bottles.

Container impact test (CIT): The test is a biaxial impact test, the container, bottom up, was put on a sample older, having the same dimension of the container The plate for the impact has a diameter of 62 mm and 5 kg of weight, it falls from 600 mm. The results are expressed in Joule and are an average of 5 tests.

Containers: Containers to be tested are produced with an injection molding machine with the following specs:
Injection molding unit parameters:
Injection screw stroke: 1200 kN
Screw diameter: 32 mm
Injected volume: 102.9 cm$^3$
Screw ratio L/D: 20
Max injection press: 2151 bar
The items to be tested must have the listed characteristics
Volume: 250 cc
Surface treatment: Polished The shape of the container is a truncated pyramid with a square base, wherein the top base has a side of 70 mm, a bottom base side of 50 mm and a height of 80 mm.

Adjustments of some parameters such as temperature profiles, injection times and pressures are allowed to obtain proper specimen in terms of shape and aspect.

IZOD Impact Strength:
Determined according to ISO 180/1A. Samples have been obtained according to ISO 294-2.

Example 1 and Comparative Examples 2,3

Terpolymers are prepared by polymerizing propylene, ethylene and hexene-1 in the presence of a catalyst under continuous conditions in a plant comprising a polymerisation apparatus as described in EP Pat. Doc. 1 012 195.

The catalyst is sent to the polymerization apparatus that comprises two interconnected cylindrical reactors, a riser and a downcomer. Fast fluidization conditions are established in the riser by recycling gas from the gas-solid separator. In Examples 1-3, no barrier feed has been used.

The catalyst employed comprises a catalyst component prepared by analogy with example 5 of EP-A-728 769 but using microspheroidal MgCl2.1.7C2H5OH instead of MgCl2.2.1C2H5OH. The catalyst component is used with dicyclopentyl dimethoxy silane (DCPMS) as an external donor along with triethylaluminium (TEA).

The polymer particles exiting the reactor are subjected to steam treatment to remove the reactive monomers and volatile substances and then dried. The main operative conditions and characteristics of the produced polymers are indicated in Table 1.

TABLE 1

Polymerization Process

| Component A | | Ex 1 1761 | Comp Ex 2 1757 | Comp Ex 3 1753 |
|---|---|---|---|---|
| TEAL/external donor | wt/wt | 4 | 4 | 5 |
| TEAL/catalyst | wt/wt | 6 | 6 | 7 |
| Temperature | °C. | 80 | 80 | 80 |
| Pressure | bar-g | 23 | 23 | 25 |
| Split holdup riser | wt % | 41 | 42 | 41 |

TABLE 1-continued

Polymerization Process

| Component A | | Ex 1 1761 | Comp Ex 2 1757 | Comp Ex 3 1753 |
|---|---|---|---|---|
| downcomer | wt % | 59 | 58 | 59 |
| $C_6^-$ riser | mole % | 2.5 | 0.95 | 0.56 |
| $C_2^-$ riser | mole % | 0.5 | 1.63 | 1.98 |
| $H_2/C_3^-$ riser | mol/mol | 0.068 | 0.07 | 0.073 |
| $C_6^-/(C_6^- + C_3^-)$ | mol/mol | 0.035 | 0.014 | 0.008 |

$C_2^-$ = ethylene $C_3^-$ = propylene $C_6^-$ = 1-hexene

The polymer particles of Examples 1-3 are introduced in an extruder, wherein they are mixed with 500 ppm of Irganox 1010 and 1000 ppm of Irgafos 168 and 500 ppm of Ca stearate, 1000 ppm of GMS 90 and 1800 ppm of Millad 3988. The polymer particles are extruded under nitrogen atmosphere in a twin screw extruder, at a rotation speed of 250 rpm and a melt temperature of 200-250° C.

Properties of the obtained material are in Table 2:

TABLE 2

| | | Ex 1 1761 | Comp Ex 2 1757 | Comp Ex 3 1753 |
|---|---|---|---|---|
| Ethylene content | Wt % | 0.5 | 2.0 | 2.8 |
| 1. hexene content | Wt % | 4.5 | 2.0 | 0.9 |
| Xylene soluble | Wt % | 5.2 | 5.1 | 5.5 |
| Hexane extractable on film | % | 1.8 | 2.0 | 2.1 |
| MFR | dl/g | 22.7 | 21.6 | 26.2 |
| Izod Impact @23° C. | kJ/m2 | 4.6 | 4.4 | 4.4 |
| Izod Impact @0° C. | kJ/m2 | 2.0 | 2.4 | 2.6 |
| Izod Impact@ −20° C. | kJ/m2 | 1.2 | 1.2 | 1.5 |
| Haze 2 mm plaque | % | 15.1 | 16.2 | 16.0 |
| Melting point | ° C. | 141.9 | 141.1 | 141.1 |

The polymers obtained were molded into containers of area 70×70×0.4 mm as described above. The containers were analyzed and the results are reported in Table 3.

TABLE 3

| | | Ex 1 1761 | Comp Ex 2 1757 | Comp Ex 3 1753 |
|---|---|---|---|---|
| Haze on container | % | 3.5 | 3.7 | 4.1 |
| Container Impact Test @ +23° C. | J | 4.4 | 4.1 | 2.3 |
| Container Impact Test @ 0° C. | J | 3.8 | 1.7 | 1.6 |
| Container Impact Test @ −20° C. | J | 3.8 | 1.5 | 1.2 |

Table 3 shows that the containers according to the present technology show improved results based on the container Impact Test and improved haze. This effect is not predictable from the raw material, in fact in Table 2 the Izod impact values for the example of the present technology are the lower values.

What is claimed is:
1. An injection molded container comprising a propylene, ethylene and 1-hexene terpolymer produced in the presence of a Ziegler-Natta catalyst wherein:
(i) the content of ethylene derived units ranges from 0.2-1.0 wt %;
(ii) the content of 1-hexene derived units ranges from more than 4 wt % to 5.5 wt %;

(iii) the content of ethylene derived units fulfills the following equation (I);

$$C2 < C6*0.16 \tag{I}$$

wherein C2 is the content of ethylene derived units in wt % and C6 is the content of 1-hexene derived units in wt %; and wherein the terpolymer has a melt flow rate (MFR) measured according to ISO 1133 (230° C., 2.16 kg) of 15-80 g/10 min, a top load value higher than 180 N, wherein the top load value is measured using a container having a 0.4 mm thick wall, a hexane extractable value as measured according to FDA 21 77:1520 of lower than 1.9 wt % and a haze value of lower than 15.5% as measured on a 2 mm terpolymer plaque.

2. The injection molded container of claim 1, wherein the content of 1-hexene derived units ranges from 3.8-5.0 wt %.

3. The injection molded container of claim 1, wherein the content of ethylene derived units ranges from 0.3-0.8 wt %.

4. The injection molded container of claim 1, wherein equation (I) is C2<C6*0.13.

5. The injection molded container of claim 1, wherein the melt flow rate, MFR, measured according to ISO 1133, 230° C., 2.16 kg, ranges from 20-50 g/10 min.

6. The injection molded container of claim 1, wherein the container comprises a wall thickness of 0.4 mm and exhibits an impact test value at 23° C. of higher than 4.5 J.

7. The injection molded container of claim 1, wherein the top load value is higher than 200 N.

8. The injection molded container of claim 1, wherein the hexane extractable value as measured according to FDA 21 77:1520 is lower than 1.87 wt %.

* * * * *

UNITED STATES PATENT AND TRADEMARK OFFICE
CERTIFICATE OF CORRECTION

PATENT NO. : 10,316,123 B2
APPLICATION NO. : 14/896430
DATED : June 11, 2019
INVENTOR(S) : Destro et al.

Page 1 of 1

It is certified that error appears in the above-identified patent and that said Letters Patent is hereby corrected as shown below:

In the Specification

In Column 1, Line 3, after "PROPYLENE BASED TERPOLYMER FOR CONTAINERS" insert
-- This application is the U.S. National Phase of PCT International Application PCT/EP2014/059200, filed May 6, 2014, claiming benefit of priority to European Patent Application No. 13170721.8, filed June 6, 2013, the contents of which are incorporated herein by reference in its entirety. --, therefor
In Column 2, Line 42, delete "phtalic" and insert -- phthalic --, therefor
In Column 6, Line 33, after "cut" insert -- , --
In Column 7, Line 7, after "container" insert -- . --

Signed and Sealed this
Twelfth Day of September, 2023

Katherine Kelly Vidal
*Director of the United States Patent and Trademark Office*